(No Model.)

L. D. BAILEY.
CIGAR WRAPPER CUTTER.

No. 355,051. Patented Dec. 28, 1886.

WITNESSES:
H. W. Beyer
Edw. M. Clark

INVENTOR:
L. D. Bailey
BY Munn & Co.
ATTORNEYS.

UNITED STATES PATENT OFFICE.

LEDYARD DELOSS BAILEY, OF CENTRAL CITY, NEBRASKA.

CIGAR-WRAPPER CUTTER.

SPECIFICATION forming part of Letters Patent No. 355,051, dated December 28, 1886.

Application filed February 1, 1886. Serial No. 190,561. (No model.)

*To all whom it may concern:*

Be it known that I, LEDYARD DELOSS BAILEY, of Central City, in the county of Merrick and State of Nebraska, have invented a new and useful Improvement in Cigar-Wrapper Cutters, of which the following is a specification, reference being had to the annexed drawings, forming a part thereof, in which—

Figure 1:
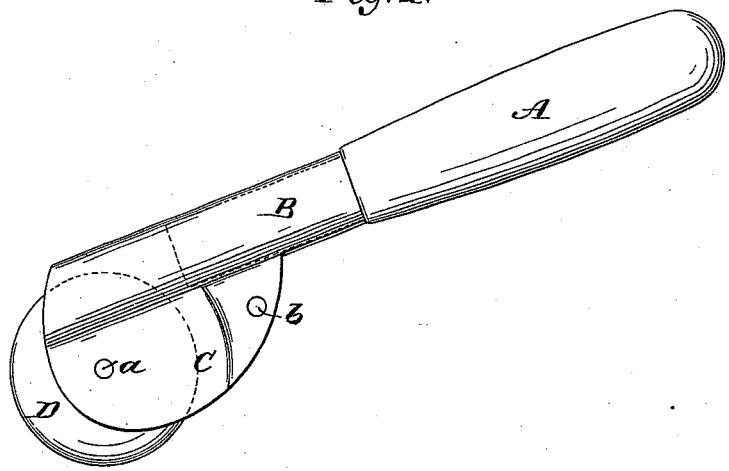
Figure 2:
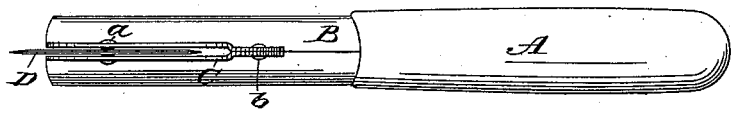
Figure 3:
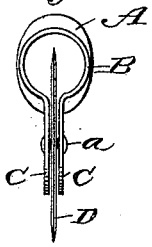

Figure 1 is a side elevation. Fig. 2 is an edge view. Fig. 3 is an end elevation.

Similar letters of reference indicate corresponding parts in the different figures of the drawings.

The object of my invention is to provide a knife for cutting the tobacco-leaf for the wrappers of cigars, which will cut near the edge of the leaf and across the stems and veins without tearing the leaf.

The invention consists in the peculiar construction and arrangement of parts, as hereinafter fully described, and pointed out in the claim.

To the handle A is secured a ferrule, B, having formed upon one side thereof ears C, between which is placed the thin circular steel knife D upon the pin $a$, passing transversely through the ears C and through the central aperture of the knife D. The ferrule is of such length that it projects beyond the end of the handle inserted in the said ferrule to receive the knife and to form a shield or guard to the same.

The ears C closely embrace the sides of the circular knife D, forming a guide for the knife, which prevents it from wabbling on its pivot, and at the same time serving to clean the knife and free it from adhering gum and particles of the tobacco-leaf. The ears C, at the heels behind the circular knife D, are drawn together and secured by a rivet, $b$.

In use my improved tobacco-knife rolls over the leaf and cuts across the stems and near the edges of the leaf without tearing it.

By my construction the ferrule and ears serve as a shield or guard, affording full protection to the hand of the operator.

I am aware that a circular rotary tobacco-cutter is not broadly new, and I therefore do not claim such invention.

Having thus described my invention, what I claim as new, and desire to secure by Letters Patent, is—

As an improved article of manufacture, a cigar-wrapper cutter consisting of the handle A, the ferrule B, formed with the downwardly-projecting ears C, bent inward and secured together at the heels, and the knife D, journaled between the ears and projecting into the ferrule, as set forth.

LEDYARD DELOSS BAILEY.

Witnesses:
W. H. WEBSTER,
E. F. WHITE.